UNITED STATES PATENT OFFICE.

SAMUEL M. McMURRAY, OF SMYRNA, TENNESSEE.

PIGMENT-POWDER FOR MAKING SMEAR-PROOF IMPRESSIONS.

1,342,638.     Specification of Letters Patent.     Patented June 8, 1920.

No Drawing.     Application filed November 26, 1918. Serial No. 264,240.

*To all whom it may concern:*

Be it known that I, SAMUEL M. McMURRAY, a citizen of the United States, residing at Smyrna, in the county of Rutherford and State of Tennessee, have invented certain new and useful Improvements in Pigment-Powder for Making Smear-Proof Impressions, of which the following is a specification.

My invention relates to improvements in pigment powders for rendering impressions smear proof.

An object of my invention is to provide a pigment powder to be used in connection with an ink, such as printers' ink, or stamp pad ink, to bring out or intensify the impression made with the ink, and also to render the impression resistant to the action of gasolene.

Other objects and advantages will appear in the following specification, and the novel features of the invention will be particularly pointed out in the appended claims.

In carrying out my invention, I take glucose, or other saccharine matter, and mix it with a coloring matter, such as lamp black, charcoal, black oxid of manganese, or other metallic oxids or sulfids. Enough water is added to make a pliable mixture, and the ingredients are thoroughly stirred together so as to make a homogeneous, plastic mass. The mixture is then dried, preferably on steam pipes, after which the dried product is finely pulverized.

I have found that the following proportions work well in practice, but it is understood that in giving these proportions I do not confine myself strictly to them, because variations may be made without departing from the spirit and the scope of the invention. My preferred formula is: glucose, or other saccharine matter, one part; powdered coloring matter, three parts. The product prepared as described above may be sprinkled from a can or other suitable container, on moist ink impressions made by a stamp pad or by type, in order to give color to said impressions, or to heighten the effect. The use of such a pigment powder in the manner described protects impressions against the action of gasolene, or other volatile solvents that are ordinarily used to clean tracing linen or sheets upon which draftsmen or engineers may be engaged in making impressions, such as those effected by drafting instruments, stamp pads, type, and the like.

A peculiar property of the pigment as thus prepared is that, after it has been placed on the moist ink impression, said impression is rubbed over with talcum, or other inert powder, which is insoluble in water, the pigment powder is softened by moisture from the hand, and at the same time, is rubbed into the letter or impression, thus making the impression practically smear proof.

A smear proof impression may be made by the use of moisture other than that from the hand, but the latter is preferable because only a slight amount of moisture is necessary, merely enough to make the inert, insoluble powder stick to the surface of the impression, thus rendering it smear resisting.

I claim:

1. The herein described pigment powder for intensifying impressions and rendering them resistant to the action of gasolene, which consists of a mixture of a saccharine substance and a coloring matter consisting of a metallic oxid, said mixture being of the form of a fine, dry powder, homogeneous throughout.

2. The herein described pigment powder for intensifying impressions and rendering them resistant to the action of gasolene, which consists of a mixture of a saccharine substance and a coloring matter consisting of a metallic oxid, said mixture being of the form of a fine, dry powder, homogeneous throughout in the proportion of one part of the saccharine substance to three parts of the metallic oxid.

3. The herein described composition of matter for rendering ink impressions resistant to the action of gasolene, and for intensifying said impressions, which consists of a mixture of one part of glucose and three parts of black oxid of manganese.

SAMUEL M. McMURRAY.